United States Patent
Kang et al.

(10) Patent No.: US 10,926,771 B2
(45) Date of Patent: Feb. 23, 2021

(54) POWER HOP ANTICIPATION AND MITIGATION

(71) Applicant: Kelsey-Hayes Company, Livonia, MI (US)

(72) Inventors: Dustin S. Kang, Livonia, MI (US); Craig B. Mitchell, Livonia, MI (US)

(73) Assignee: ZF Active Safety US Inc., Livonia, MI (US)

( * ) Notice: Subject to any disclaimer, the term of this patent is extended or adjusted under 35 U.S.C. 154(b) by 104 days.

(21) Appl. No.: 16/320,130

(22) PCT Filed: Jul. 27, 2017

(86) PCT No.: PCT/US2017/044245
§ 371 (c)(1),
(2) Date: Jan. 24, 2019

(87) PCT Pub. No.: WO2018/022934
PCT Pub. Date: Feb. 1, 2018

(65) Prior Publication Data
US 2019/0225226 A1 Jul. 25, 2019

Related U.S. Application Data

(60) Provisional application No. 62/367,167, filed on Jul. 27, 2016.

(51) Int. Cl.
*B60W 30/20* (2006.01)
*B60T 8/1755* (2006.01)
(Continued)

(52) U.S. Cl.
CPC ............ *B60W 30/20* (2013.01); *B60T 8/171* (2013.01); *B60T 8/172* (2013.01); *B60T 8/175* (2013.01);
(Continued)

(58) Field of Classification Search
CPC ........ Y10T 477/817; B60W 2520/125; B60W 2540/30; B60W 2540/18;
(Continued)

(56) References Cited

U.S. PATENT DOCUMENTS

| 8,630,779 B2 * | 1/2014 | Moran ............. B60W 30/18118 701/70 |
| 2002/0075139 A1 * | 6/2002 | Yamamoto ............ B60R 21/013 340/436 |

(Continued)

FOREIGN PATENT DOCUMENTS

KR 101282004 B1 7/2013

OTHER PUBLICATIONS

English translation of KR20130048483A (same publication as KR101282004B1); http://translationportal.epo.org; Apr. 8, 2020 (Year: 2020).*

(Continued)

*Primary Examiner* — Roger L Pang
(74) *Attorney, Agent, or Firm* — Robert James Harwood

(57) ABSTRACT

Longitudinal acceleration, intended travel angle, wheel speed, and requested drive torque signals are measured for a vehicle. The longitudinal acceleration, intended travel angle, wheel speed, and requested drive torque signals are then evaluated. A brake torque is calculated as a function of a propulsive torque, wherein the propulsive torque is produced by a power source for the vehicle. The brake torque is applied when the longitudinal acceleration signal exceeds a longitudinal acceleration threshold, the intended travel angle signal is between intended travel angle limits, the wheel speed signal is less than a minimum speed threshold, the requested drive torque signal exceeds a requested drive torque threshold, and a torque threshold is exceeded.

20 Claims, 5 Drawing Sheets

(51) Int. Cl.
*B60W 30/18* (2012.01)
*B60T 8/175* (2006.01)
*B60T 8/171* (2006.01)
*B60T 8/172* (2006.01)
*B60T 8/32* (2006.01)
*B60T 8/58* (2006.01)
*B60W 10/06* (2006.01)
*B60W 10/184* (2012.01)

(52) U.S. Cl.
CPC ........ *B60T 8/17555* (2013.01); *B60T 8/3205* (2013.01); *B60T 8/58* (2013.01); *B60W 10/06* (2013.01); *B60W 10/184* (2013.01); *B60W 30/18172* (2013.01); *B60T 2210/124* (2013.01); *B60T 2210/30* (2013.01); *B60T 2210/36* (2013.01); *B60T 2240/00* (2013.01); *B60T 2250/04* (2013.01); *B60T 2270/20* (2013.01); *B60W 2510/0657* (2013.01); *B60W 2510/0661* (2013.01); *B60W 2510/10* (2013.01); *B60W 2520/10* (2013.01); *B60W 2520/105* (2013.01); *B60W 2520/125* (2013.01); *B60W 2530/20* (2013.01); *B60W 2540/10* (2013.01); *B60W 2540/18* (2013.01); *B60W 2540/30* (2013.01); *B60W 2552/40* (2020.02); *B60W 2555/20* (2020.02); *B60W 2710/0666* (2013.01); *B60W 2710/18* (2013.01); *B60W 2710/182* (2013.01); *Y10T 477/817* (2015.01)

(58) Field of Classification Search
CPC ....... B60W 2520/105; B60W 2520/10; B60W 2510/0661; B60W 2510/0657; B60W 2710/18; B60W 2710/0666; B60W 2550/148; B60W 2550/12; B60W 2530/20; B60W 2510/10; B60W 2710/182; B60W 2540/10; B60W 30/18; B60W 10/184; B60W 30/20; B60T 8/175; B60T 8/171; B60T 8/172; B60T 8/3205; B60T 8/58; B60T 8/1755; B60T 2210/124; B60T 2210/30; B60T 2240/00; B60T 2250/04; B60T 2270/20

See application file for complete search history.

(56) References Cited

U.S. PATENT DOCUMENTS

| | | |
|---|---|---|
| 2005/0269796 A1 | 12/2005 | Sawarynski et al. |
| 2008/0221756 A1 | 9/2008 | Miskin |
| 2008/0319623 A1 | 12/2008 | Dobkin et al. |
| 2009/0012686 A1* | 1/2009 | Maeda ................ B60T 8/174 701/70 |
| 2010/0174463 A1* | 7/2010 | Uragami ............. B60T 8/1755 701/70 |
| 2011/0288697 A1* | 11/2011 | Yu ........................ B60K 6/48 701/22 |
| 2012/0303236 A1* | 11/2012 | Andonian ............. B60T 8/175 701/83 |
| 2016/0001654 A1 | 1/2016 | Nolte et al. |

OTHER PUBLICATIONS

PCT International Search Report, Application No. PCT/US2017/044245, dated Oct. 25, 2017.

* cited by examiner

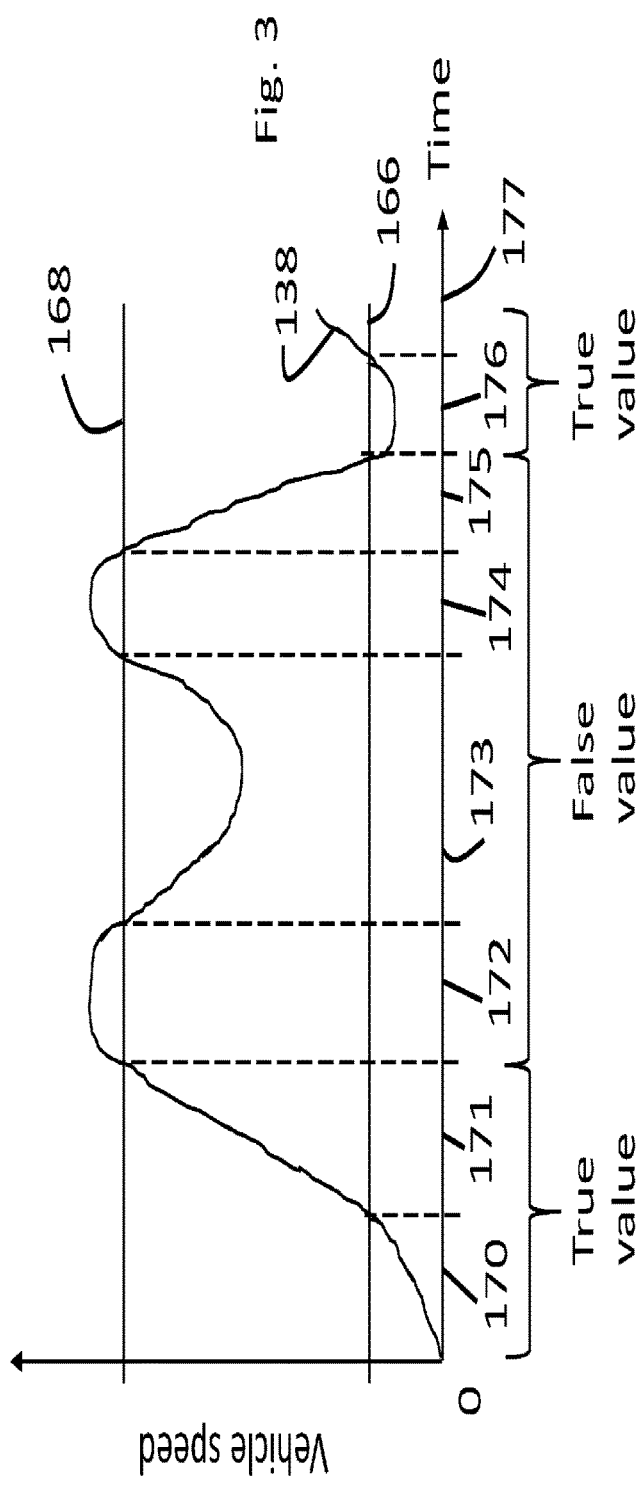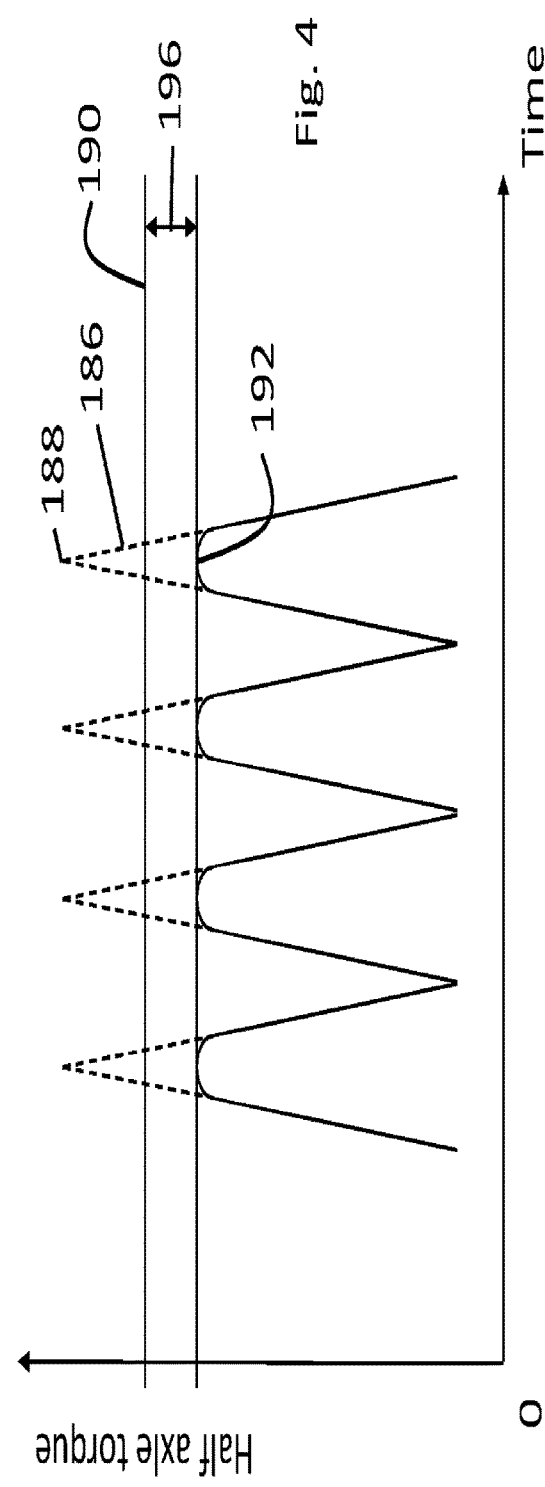

POWER HOP ANTICIPATION AND MITIGATION

CROSS REFERENCE TO RELATED APPLICATION

This application claims priority to, and the benefit of, U.S. Provisional Application Ser. No. 62/367,167, filed Jul. 27, 2016, the full disclosure of which is incorporated herein by reference.

BACKGROUND OF THE INVENTION

This invention relates in general to vehicle brake systems and in particular to a method of operation for the vehicle brake system to preemptively mitigate power hop and driveline oscillation.

Automobiles include a powertrain that carries torque from a power source to driven wheels of the vehicle. For example, the power source may be an internal combustion engine transmitting torque to a transmission or an electric motor connected to the drive wheels. A driveline transmits the torque to the powered wheels. The driveline typically includes an axle or half shafts that drive the driven wheels.

During aggressive or heavy acceleration of the vehicle, power hop may occur at the driven wheels. Power hop is an undesired movement of the driven wheels that occurs as the driven wheels intermittently slip and grip relative to the road surface. This intermittent wheel slip and wheel grip condition causes an oscillatory forcing function that reacts against the vehicle suspension system. Because the suspension is part of the vehicular mass/spring system, the oscillatory forcing function creates a sympathetic vibratory response of the axle and/or drive wheels rolling and/or pitching at or near the axle roll center. This vibratory mode may approach a suspension or structural resonance that exacerbates the deflections and resulting vibration levels. These deflections can result in undesirable NVH (noise, vibration, harshness) characteristics, excessive component wear or failures of driveline and suspension components.

When oscillations associated power hop commence and are detected in the driveline, power hop may be mitigated by reducing torque produced by the power source. However, this feed-forward mitigation only occurs after power hop has already started and is producing oscillations. Therefore, it would be desirable to predict or anticipate the conditions that create a power hop condition and preemptively mitigate power hop—i.e., mitigate power hop before power hop occurs.

SUMMARY OF THE INVENTION

This invention relates to a method of anticipating and mitigating a power hop condition in a vehicular powertrain. In a first embodiment, the method includes measuring signals related to vehicular dynamic operating conditions such as a vehicle speed, a longitudinal acceleration signal, a lateral acceleration signal, and intended travel angle and a requested drive torque signal. A vehicular normal force is estimated from the measured signals. A braking torque is calculated as a function of a drive torque produced by the vehicle's power source, such as the engine, engine/transmission, electric motor, and the like. Operative braking inputs, such as fluid pressure applied to wheel brake actuators, are calculated from the calculated value of braking torque. Braking torque is applied to the wheels when the normal force signal is less than a normal force threshold and when a drive torque threshold is exceeded.

Various aspects of this invention will become apparent to those skilled in the art from the following detailed description of the preferred embodiment, when read in light of the accompanying drawings.

BRIEF DESCRIPTION OF THE DRAWINGS

FIG. 3 is a graph of wheel speed evaluation for the method of FIG. 2.

FIG. 4 is a graph comparing wheel torque with and without the method of FIG. 2.

DETAILED DESCRIPTION OF THE PREFERRED EMBODIMENTS

Figure 1:
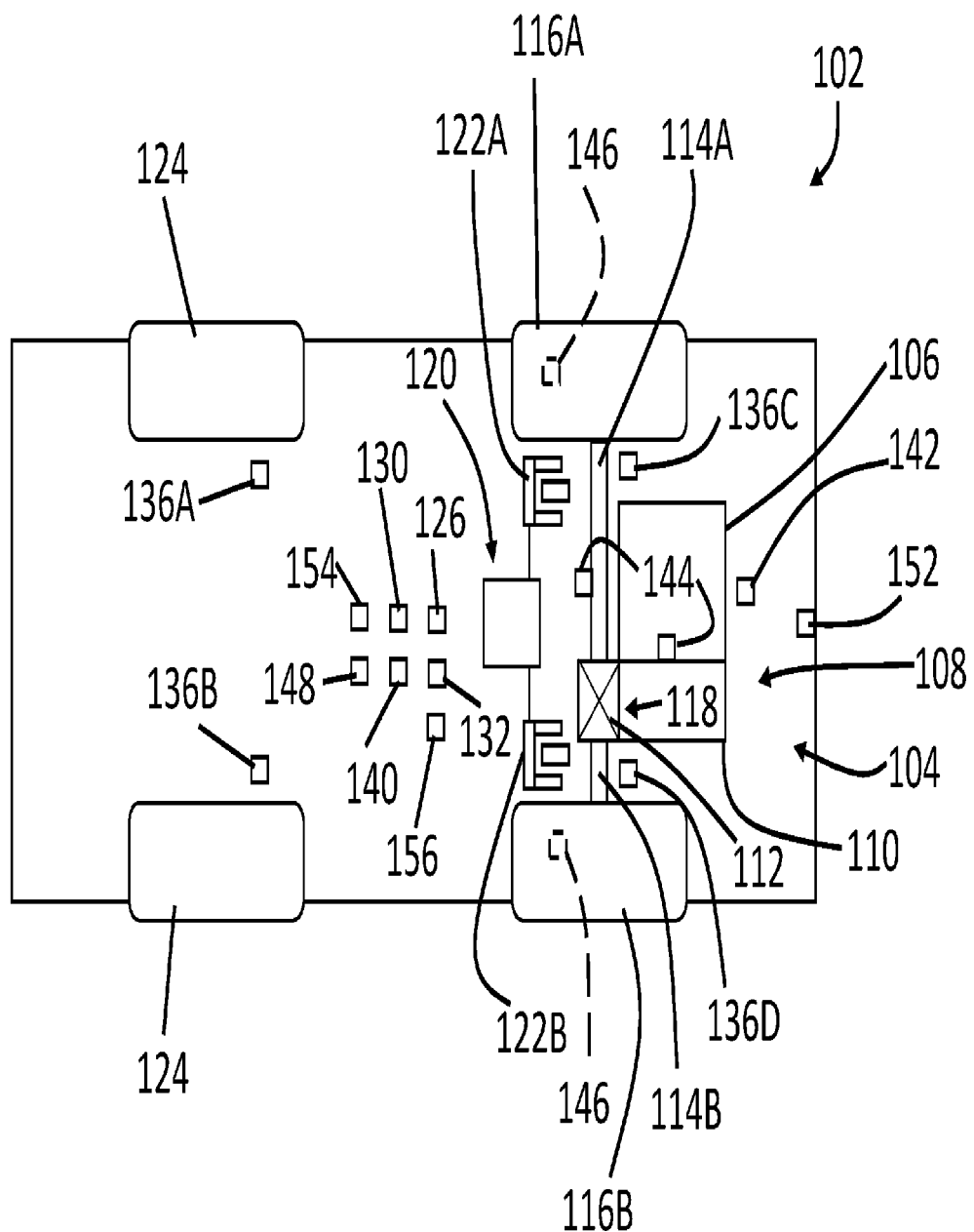
FIG. 1 is a schematic view of an automotive vehicle.

Referring now to FIGS. 1-5, there is illustrated a control method 100 for anticipating and mitigating power hop for a vehicle, indicated generally at 102. The vehicle 102 is schematically illustrated in FIG. 1 and has a powertrain, indicated generally at 104. The powertrain 104 has a power source 106, such as an internal combustion engine, an electric motor, or other power generating device for producing engine or motor torque.

The powertrain 104 further has a drivetrain, indicated generally at 108, connected to the power source 106 and receives the engine torque. In the illustrated embodiment, the drivetrain 108 is configured as a transaxle that includes a transmission 110 and differential 112. The drivetrain 108 is shown in the environment of a Front Wheel Drive (FWD) powertrain, though other powertrain configurations are considered to be within the scope of the invention. For example, the drivetrain 108 may be configured as an FWD-based All-Wheel-Drive system, a Rear Wheel Drive (RWD) system, or a four wheel drive system. The illustrated transaxle 108 is connected to first and second halfshafts 114A and 114B and outputs a drive torque, through the halfshafts, to first and second drive wheels 116A and 116B to propel the vehicle.

The vehicle 102 further has a brake system, indicated generally at 120, which includes first and second wheel brakes 122A and 122B, respectively. In one embodiment, the brake system 120 may be as described in U.S. Pat. No. 9,321,444 to Ganzel, the disclosure of which is hereby incorporated herein by reference in its entirety. The first and second wheel brakes 122A and 122B apply a braking pressure to the first and second drive wheels 116A and 116B, respectively. It should be understood that wheel brakes similar to wheel brakes 122A, B may be applied to all wheels of the vehicle 102 including additional drive wheels and non-driving wheels 124. In one embodiment, the brake system 120 uses hydraulic pressure to actuate the first and second braking devices 122A and 122B, respectively, and slow the vehicle 102.

The vehicle 102 further has a plurality of sensors. A longitudinal acceleration sensor 126 measures longitudinal acceleration $A_x$ of the vehicle 102 and produces an associated longitudinal acceleration signal. A lateral acceleration sensor 130 measures lateral acceleration $A_y$ of the vehicle 102 and outputs a lateral acceleration signal.

Figure 5:
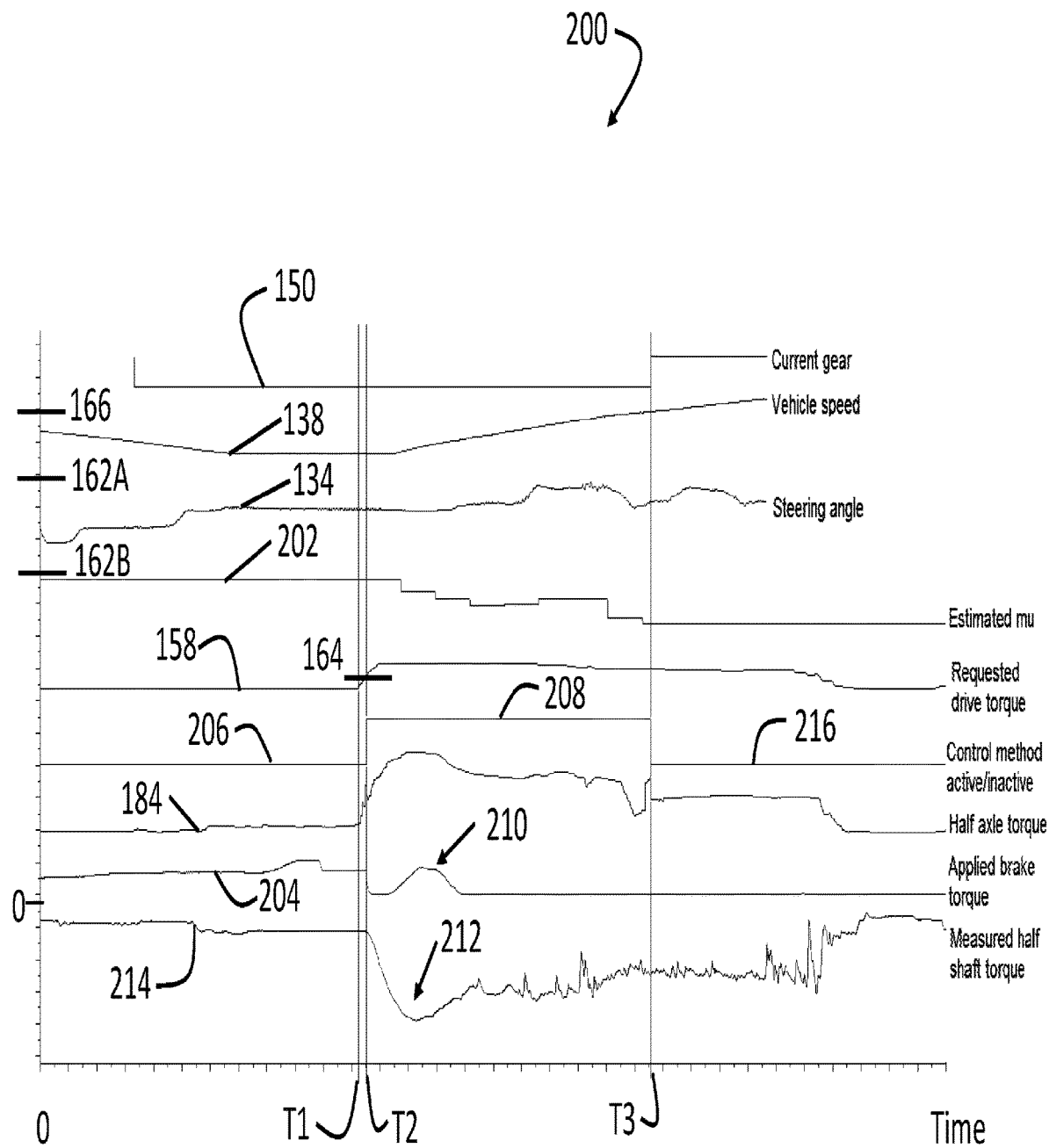
FIG. 5 is an example of the method of FIG. 2 applied to the automotive vehicle of FIG. 1.

A steering wheel sensor 132 measures a steering wheel angle for a steering wheel of the vehicle 102 and outputs a steering wheel angle signal, shown in FIG. 5 as signal 134. A wheel speed sensor 136A measures a wheel speed of at least one non-driving wheel 124 to determine a vehicle speed. A second wheel speed sensor 136B may be provided on another non-driving wheel 124. In certain embodiments, the non-driving wheels 124 may be drive wheels in addition to drive wheels 116A and 116B. Wheel speed sensors 136C and 136D measure a wheel speed for the first and second drive wheels 116A and 116B, respectively, and output respective first and second wheel speed signals. As shown in FIG. 5, one of the drive wheel speed sensors, such as sensor 136C, is used to produce an associated vehicle speed signal 138. An accelerator pedal sensor 140 measures a position of an accelerator pedal and outputs an accelerator pedal position signal. When the power source 106 is an internal combustion engine (as illustrated in FIG. 1), a throttle sensor 142 measures a throttle plate position and provides a throttle position signal.

A torque sensor 144 measures the drive torque and produces a drive torque signal. Alternatively, the torque sensor 144 may measure engine or motor torque to produce the drive torque signal. Tire pressure sensors 146 measure tire pressures for the first and second driven wheels 116A and 116B, respectively, and provide a tire pressure signal. The tire pressure sensors 146 may be provided on all wheels of the vehicle. A temperature sensor 148 measures an ambient temperature around the vehicle 102 as a temperature signal. A powertrain mode sensor communicates an operational configuration of the powertrain 104—e.g., operation in front wheel drive or all wheel drive configurations. A current gear signal 150, shown in FIG. 5, communicates the current gear of the transmission 110. A split mu surface signal communicates detection of a split mu surface. A drive mode selection switch communicates selection of a driving mode for the powertrain 104—e.g., sport, towing, snow, or off road driving modes.

The vehicle 102 may further have one or more cameras 152 configured to transmit a video signal of road conditions affecting the vehicle. For example, the vehicle 102 may have a forward facing camera for characterizing a driving surface—e.g., the camera 152 may characterize the driving surface as pavement or gravel. Furthermore, the camera 152 may be used to calculate the longitudinal acceleration signal, the lateral acceleration signal, or the vehicle speed signal 138.

The vehicle 102 may further have a global positioning system (GPS) 154 for locating a geographic position of the vehicle 102. Using the GPS 154, the longitudinal acceleration signal, the lateral acceleration signal, or the vehicle speed signal 138 may be determined.

The control method 100 is performed by a control algorithm implemented on an electronic control module (ECM) 156 that receives the signals from the sensors and commands operation of the brake system 120. As a non-limiting example, the ECM 156 may be a traction control (TC) module in which the control algorithm is incorporated.

Figure 2:
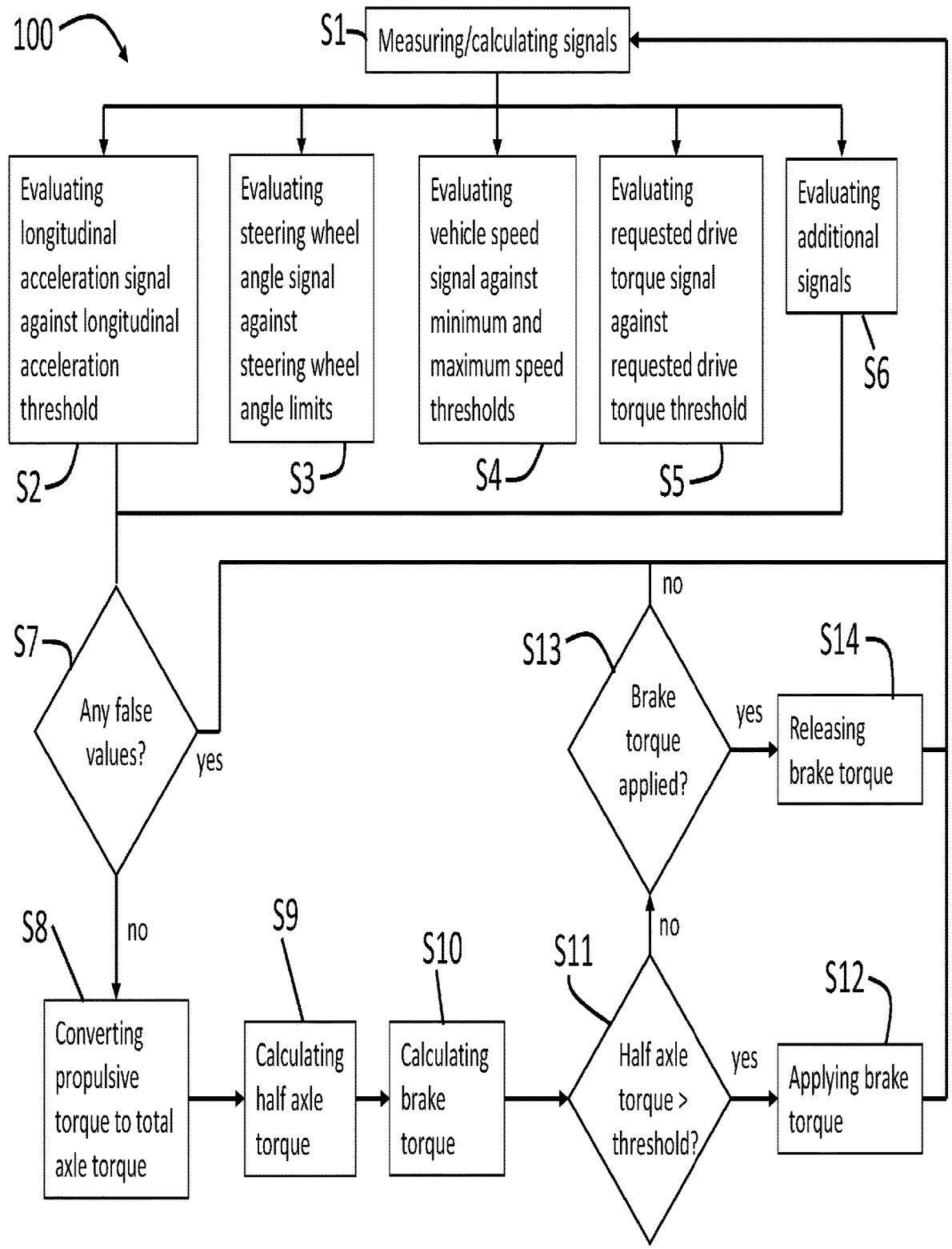
FIG. 2 is a flowchart of a method for anticipating and mitigating power hop for the automotive vehicle of FIG. 1.

FIG. 2 illustrates the control method 100. In a step S1, the various sensors measure specific vehicle conditions and transmit the respective signals to the ECM 156. Specifically, the longitudinal acceleration signal is measured by the longitudinal sensor 126, the steering wheel angle is measured by the steering wheel sensor 132, and the wheel speed signal (associated with the vehicle speed signal 138) is measured by one or more of the speed sensors 136A, 136B, 136C, and 136D, and in one embodiment, measured by wheel speed sensor 136A. As described, the longitudinal acceleration, steering wheel angle, and vehicle speed are directly measured by the appropriate sensor. Alternatively, one or more of the longitudinal acceleration, steering wheel angle, and vehicle speed may be estimated, derived, or otherwise calculated from other vehicle sensor signals or other vehicle measurement protocols. For example, the longitudinal acceleration and vehicle speed may be calculated using signals from the camera 152 or the GPS 154.

The step S1 also includes calculating or determining a requested drive torque signal 158. The requested drive torque signal 158 is indicative of a torque requested by the driver to be delivered to the drive wheels. As non-limiting examples, the requested drive torque signal 158 may be calculated from the accelerator pedal position signal measured by the accelerator pedal sensor 140 or the throttle position signal measured by the throttle sensor 144. Alternatively, the requested drive torque signal 158 may be otherwise generated without intervention of the driver of the vehicle 102 such as in a self-driving vehicle or autonomous vehicle such as an autonomous electric vehicle.

The ECM 156 evaluates the respective signals (representative of the respective measured vehicle parameters) against predetermined criteria, such as upper and lower thresholds or first and second thresholds for each measured signal, such as threshold limits shown in FIG. 5. In a step S2, the longitudinal acceleration is evaluated against a longitudinal acceleration threshold. When the longitudinal acceleration signal exceeds the longitudinal acceleration threshold, step S2 returns a true value. Otherwise, the step S2 returns a false value. As a non-limiting example, the longitudinal acceleration threshold may be an upper longitudinal threshold. In one embodiment, the longitudinal threshold may be in a range of about 3 m/s$^2$ to about 4 m/s$^2$. In another embodiment, the longitudinal threshold may be about 3.6 m/s$^2$.

In a step S3, the measured steering wheel angle signal 134 is evaluated against first and second steering wheel angle limits 162A and 162B, respectively. When the steering wheel angle signal 134 is between the first and second road wheel angle limits 162A and 162B, respectively, the step S3 returns a true value. Otherwise, the step S3 returns a false value. As a non-limiting example, the first and second steering wheel angle limits 162A and 162B, respectively, may be +45° and −45°, respectively, from a 0° angle representing a straight line of vehicle travel.

In a step S4, the vehicle speed signal 138 is evaluated against a minimum speed threshold 166 and a maximum speed threshold 168, which are illustrated in detail in FIG. 3. When the vehicle speed signal 138 is less than or equal to the minimum speed threshold 166, the step S4 returns a true value. When the vehicle speed signal 138 starts increasing from a value less than or equal to the minimum speed threshold 166, the step S4 returns a true value until the vehicle speed signal 138 is greater than the maximum speed threshold 168. When the vehicle speed signal 138 starts increasing from a value greater than the minimum speed threshold 166, the step S4 returns a false value. When the vehicle speed signal 138 is greater than the maximum speed threshold 168, the step S4 returns a false value. As non-limiting examples, the minimum speed threshold 166 may be 2 m/s and the maximum speed threshold 168 may be 9 m/s.

A non-limiting example of the step S4 is illustrated in FIG. 3. The vehicle speed signal 138 varies in magnitude with time.

During a first time period 170, the vehicle speed signal 138 is less than or equal to the minimum speed threshold 166 and the step S4 returns a true value.

During a second time period 171, the vehicle speed signal 138 increases from the minimum speed threshold 166 to being equal to the maximum speed threshold 168. Because the vehicle speed signal 138 was less than or equal to the minimum speed threshold 166 in a time period preceding the second time period 171—i.e., during the first time period 170—the step S4 continues to return a true value during the second time period 171 even though the minimum speed threshold 166 is now exceeded.

During a third time period 172, the vehicle speed signal 138 is greater than the maximum speed threshold 168 and the step S4 returns a false value.

During a fourth time period 173, the vehicle speed signal 138 is less than or equal to the maximum speed threshold 168 but still greater than the minimum speed threshold 166. The step S4 returns a false value because the vehicle speed signal 138 was not less than or equal to the minimum speed threshold 166 in the time period preceding the fourth time period 173—i.e., during the third time period 172.

During a fifth time period 174 the vehicle speed signal 138 is again greater than the maximum speed threshold 168 and the step S4 returns a false value.

During a sixth time period 175 the vehicle speed signal 138 is decreasing from equal to the maximum speed threshold 168 to the minimum speed threshold 166. The step S4 returns a false value because the vehicle speed signal 138 was not less than or equal to the minimum speed threshold 166 in the time period preceding the sixth time period 175—i.e., the fifth time period 174.

During a seventh time period 176 the vehicle speed signal 138 is less than or equal to the minimum speed threshold 166 and the step S4 returns a true value.

During an eighth time period 177 the vehicle speed signal 138 increases from the minimum speed threshold 166. The step S4 continues to return a true value because the vehicle speed signal 138 was less than or equal to the minimum speed threshold 166 during the seventh time period 176—i.e., the time period immediately preceding the eighth time period 177.

Alternatively, only the minimum speed threshold 166 may be used for the control method 100.

The first and second steering wheel angle limits 162A and 162B, respectively, and the minimum and maximum speed thresholds 166 and 168, respectively, are calibrated such that the control method 100 proceeds when the vehicle 102 is traveling in a substantially straight line.

In a step S5, the requested drive torque signal 158 is evaluated against a requested drive torque threshold 164. When the requested drive torque signal 158 exceeds the requested drive torque threshold 164, the step S5 returns a true value. Otherwise, the step S5 returns a false value. In one embodiment, the requested drive torque threshold 164 may be set to correspond to either the engine torque, motor torque produced by the power source 106 or drive torque produced by the drivetrain 108 at 50% of the accelerator pedal position or the representative pedal position signal. As a non-limiting example, the requested drive torque signal 158 may be the accelerator pedal position signal and the requested rive torque threshold 164 may correspond to 50% depression of the accelerator pedal.

The longitudinal acceleration threshold, first and second steering wheel angle limits 162A and 162B, respectively, requested drive torque threshold 164, minimum speed threshold 166, and maximum speed threshold 168 are calibrated specifically for the vehicle 102. The longitudinal acceleration threshold, first and second steering wheel angle limits 162A and 162B, respectively, requested drive torque threshold 164, minimum speed threshold 166, and maximum speed threshold 168 are calibrated to values that occur prior to the occurrence of power hop for the vehicle 102. As a result, the steps S2-S5 return true values before power hop occurs.

In a step S6, additional signals may be evaluated. As non-limiting examples, the additional signals may be the powertrain configuration signal, the current gear signal 150, the split mu surface signal, or the temperature signal. For example, the powertrain configuration signal indicating the powertrain 104 is in the front wheel drive configuration would return a true value. For example, the current gear signal 150 indicating the transmission 110 is in first or reverse gear would return a true value. For example, the split mu surface signal indicating the vehicle 102 is on a split mu surface would return a false value. For example, the temperature signal indicating the ambient temperature is below a temperature threshold would return a true value.

A further additional signal for the step S6 may be a vehicle mass signal. The vehicle mass signal may be calculated by dividing the drive torque or engine torque signal by the longitudinal acceleration signal. A further additional signal for the step S6 may be the road surface characterization signal from the front camera 152. For example, the road characterization signal indicating a "hard" surface such as pavement would return a true value and the road characterization signal indicating a "soft" surface such as gravel would return a false value.

The step S6 may be omitted from the control method 100. When the step S6 is omitted, the control method 100 proceeds to the step S7 after only the steps S2-S5.

In a step S7, a check is made of the values returned by the steps S2-S6. When the steps S2-S6 each return a true value, then the control method 100 has an active status and proceeds to a step S8. When any of the steps S2-S6 return a false value, the control method 100 has an inactive status and returns to the step S1.

Alternatively, for the step S7, the control method 100 may allow one or more false values to be returned for the step S6—i.e., false values for the additional signals—and still proceed to the step S8 when the steps S2-S5 all return true values. The values returned by the steps S2-S6 may all be weighted equally. Alternatively, true values returned by the steps S2-S5 may have greater weight than any false values returned by the step S6.

When engine or motor torque is measured and used as one of the system sensor inputs, in the step S8 the engine torque is converted to the drive torque or an axle torque. Converting the engine torque to the total axle torque considers such factors as friction loss from the drivetrain 108 and other components of the powertrain 104. The total axle torque is a sum of torque driving both the first and second half shafts 114A and 114B, respectively.

Then, in a step S9, a half axle torque 184 is calculated from the axle torque:

$$\text{half axle torque} = (\tfrac{1}{2})(\text{axle torque}) \tag{1}$$

In a step S10, a brake torque is calculated as a function of the half axle torque 184:

$$\text{brake torque} = \max(0, \text{half axle torque} - \text{torque threshold}) \tag{2}$$

The brake torque is a maximum of either zero or the half axle torque 184 minus a torque threshold. As a result, the brake torque is set to zero until the half axle torque 184 exceeds the torque threshold. The torque threshold is calibrated for the specific vehicle 102 the control method 100 is used with as a function of peak power for the power source 106, a rate at which the power source 106 makes power, and braking force developed by the brake system 120. As a non-limiting example, the torque threshold may be 1,800 N*m.

Equation (2) may also be written as:

$$\text{brake torque} = (\text{gain})(\text{half axle torque}) - \text{torque threshold} \quad (3)$$

where the gain term may be used to adjust or otherwise tune the brake torque. For example, the gain term may be adjusted as a function of the tire pressure signal. When the tire pressure signal indicates a higher tire pressure, then the gain term may be increased for faster application of the brake system 120.

A step S11, determines if the half axle torque 184 exceeds the torque threshold. When the half axle torque 184 exceeds the torque threshold, the control method 100 proceeds to a step S12. When the half axle torque 184 does not exceed the torque threshold, the control method 100 proceeds to a step S13.

In step S12, the brake torque is produced by the brake system 120. Specifically, the first wheel brake 122A is applied to brake the first drive wheel 116B and the second wheel brake 122B is applied to brake the second drive wheel 116B. A brake apply rate for the brake torque is calibrated to an amount of the brake torque. As a non-limiting example, the brake apply rate may be 1,000 N*m/s. Preferably, the brake torque is applied equally to the first and second driven wheels 116A and 116B, respectively. Alternatively, the brake torque may be proportioned between the first and second driven wheels 116A and 116B, respectively.

After the step S12, the control method 100 returns to the step S1.

In the step S13, a check is made if the brake torque is currently applied. For the control method 100, the brake torque would be currently applied from a previous iteration in which the step S12 applied the brake torque. When the brake torque is applied, the control method 100 releases the brake torque in a step S14 and then returns to the step S1. Otherwise, when the brake torque is not applied, the control method 100 returns to the step S1 from the step S13.

FIG. 4 compares half axle torques, with and without the control method 100, during the power hop condition for the vehicle 102. A first half axle torque 186 for the vehicle 102 is without the control method 100. The first half axle torque 186 has sharp peaks 188. Although illustrated as having a constant magnitude, the sharp peaks 188 may be increasing in magnitude when the requested drive torque is increasing or decreasing in magnitude when the requested drive torque is decreasing.

The peaks 188 exceed a maximum torque limit 190. The maximum torque limit 190 is a half axle torque amount above which the power hop condition is detrimental to the vehicle 102. A second half axle torque 192 is produced under the same conditions as the first half axle torque 186, but with the control method 100 in the active status. Where the first axle torque 186 has the peaks 188, the second half axle torque 192 is rounded and no longer exceeds the maximum torque limit 190.

The rounded peaks 194 are less than the maximum torque limit 190 by a torque amount 196. The torque amount 196 may be reduced to desensitize the control method 100. When the torque amount 196 is reduced, the second half axle torque 192 will approach closer to the maximum torque limit 190. Reducing the torque amount 196 may be desirable when the drive mode selection signal indicates selection of an aggressive driving mode such as the sport mode. As non-limiting examples, the torque amount 196 may be reduced by increasing the torque threshold. The brake torque calculated by the control method 100 may be applied in conjunction with reducing the engine torque. After the step S7 the engine torque may be reduced. The engine torque may be reduced with or without application of the brake torque calculated in the step S10. Reducing the engine torque will also reduce the brake torque calculated by equations (2) and (3) because the brake torque is calculated as a function of the engine torque.

FIG. 5 illustrates traces, indicated generally at 200, showing an example of the control method 100 applied to the automotive vehicle 102.

Before a time T1, the steering wheel angle signal 134, vehicle speed signal 138, and requested drive torque signal 158 are all generally in a steady state condition or may be substantially constant. An estimated coefficient of friction (µ) signal 202 is also constant. The estimated coefficient of friction signal 202 is calculated from the longitudinal acceleration signal using techniques known to those skilled in the art. Also illustrated is an applied brake force 204 produced by the brake system 120. Before the time T1, the control method 100 has the inactive status, indicated at 206.

At the time T1, the requested drive torque 158 starts increasing. For example, the requested drive torque 158 may increase because the driver of the vehicle 100 has depressed the accelerator pedal. Also at the time T1, the half axle torque 184 begins increasing as the requested drive torque 158 is produced by the power source 106.

Between the time T1 and a time T2, the step S2 returns a true value because the longitudinal acceleration signal exceeds the longitudinal acceleration threshold, the step S3 returns a true value because the steering wheel angle signal 134 is between the first and second steering wheel angle limits 162A and 162B, respectively, and the step S5 also returns a true signal because the vehicle speed signal 138 is below the minimum speed threshold 166. Then, at the time T2, the step S4 also returns a true value because the requested drive torque 158 has increased to be greater than the requested drive torque threshold 164. Furthermore, the step S6 also returns a true value for the current gear signal 150 because the transmission 110 is in first gear.

As a result of the true values received by the step S7, at the time T2, the control method 100 assumes the active status, indicated at 208. Immediately after the time T2, the step S8 starts converting the engine torque to axle torque, the step S9 starts calculating the half axle torque 184 from the axle torque, and the step S10 starts calculating the brake torque from the half axle torque 184.

When the half axle torque 184 exceeds the torque threshold, the brake torque is greater than zero and applied by the brake system 120 as applied brake torque 208. Application of the brake torque specifically calculated in the step S10 is indicated generally at 210 by an increase in the applied brake torque 208. Corresponding to the application of the brake torque at 210 is a smoothing, indicated generally at 212, of measured wheel torque 210. The applied brake torque 208 subsequently starts decreasing when the half axle torque 184 starts decreasing. The applied brake torque 208 returns to zero when the brake torque is again less than the torque threshold.

Between the time T2 and a time T3, the steps S2-S6 continue returning true values. Also between the times T2 and T3, the estimated coefficient of friction 202 changes as the estimated coefficient of friction 202 is updated using the longitudinal acceleration signal—i.e., the estimated coefficient of friction 202 is refined.

Then, at the time T3, the step S6 returns a false value because the current gear signal changes from first gear to second gear. As a result, the control method 140 returns to the inactive status, indicated at 214, and returns to the step S1.

Figure 6:
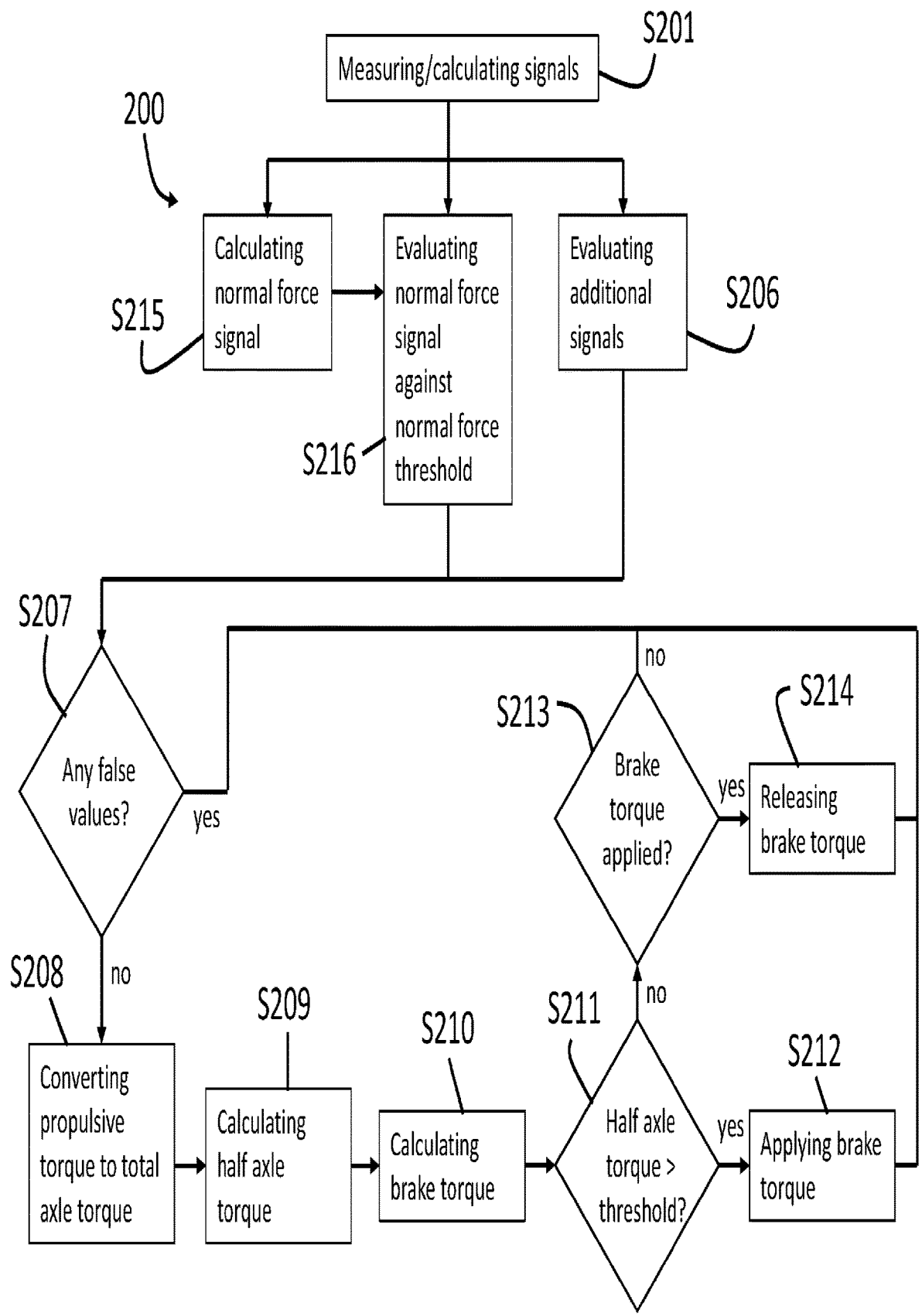
FIG. 6 is a flowchart of a second embodiment of the method for anticipating and mitigating power hop for the automotive vehicle of FIG. 1.

Referring now to FIG. 6, there is illustrated a second embodiment of the control method, indicated generally at 300. The control method 300 is a variation of the control method 100 previously discussed with reference to FIGS. 1-5. As such, like reference numerals, incremented by 200, designate corresponding parts in the drawings and detailed description thereof will be omitted.

In a step S215, the control method 340 calculates a first normal force for a first driven wheel and a second normal force for a second driven wheel. The first and second normal forces are calculated as described by U.S. Patent Publication No. 2017/0001644 to Hartman et al., the disclosure of which is hereby incorporated herein by reference in its entirety.

In a step S216, the first and second normal forces are compared to a normal force threshold. When one of the first and second normal forces are less than the normal force threshold (i.e., normal forces at the first and second driven wheels are indicative of a potential wheel slip condition), the step S216 returns a true value. Otherwise, the step S216 returns a false value. Alternatively, the first and second normal forces may be evaluated together. In one embodiment, the normal force threshold is calibrated specifically for the vehicle. The normal force threshold is calibrated to a value that occurs prior to an onset or occurrence of a power hop condition for the vehicle. As a result, the step S216 returns a true value before the power hop condition occurs.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A method of mitigating power hop in a vehicle, the method comprising the steps of:
    measuring a longitudinal acceleration, an intended travel angle, a vehicle speed, and a requested drive torque and generating signals therefore;
    evaluating the longitudinal acceleration signal, the intended travel angle signal, the vehicle speed signal, and the requested drive torque signal against a longitudinal acceleration signal threshold, an intended travel angle signal threshold range, a speed signal threshold, and a requested drive torque signal threshold, respectively;
    calculating a brake torque as a function of a propulsive torque, wherein the propulsive torque is produced by a power source for the vehicle; and
    applying the brake torque when the longitudinal acceleration signal exceeds a longitudinal acceleration threshold, the intended travel angle signal is between the intended travel angle signal threshold range, the vehicle speed signal is less than the speed signal threshold, and the requested drive torque signal exceeds the requested drive torque threshold, and a torque threshold is exceeded.

2. The method of claim 1 further comprising:
    calibrating the longitudinal acceleration threshold, the intended travel angle limits, the minimum speed threshold, and the requested drive torque threshold to values for a vehicle that occur prior to an onset of power hop.

3. The method of claim 2 further comprising:
    calibrating the torque threshold as a function of peak power for the vehicle power source, a rate at which the vehicle power source produces torque, and braking force developed by a vehicle brake system applying the brake torque.

4. The method of claim 1 wherein the intended travel angle signal is measured from a steering wheel angle signal.

5. The method of claim 1 further comprising:
    applying the brake torque when the wheel speed signal is less than a maximum speed threshold and the wheel speed signal is currently increasing from less than or equal to the minimum speed threshold, wherein the brake torque is not applied when the wheel speed signal is greater than the minimum speed threshold and is not currently increasing from less than or equal to the minimum speed threshold or the wheel speed signal is greater than the maximum speed threshold.

6. The method of claim 1 further comprising:
    measuring an additional signal;
    evaluating the additional signal against an additional signal threshold; and
    applying the brake torque in response to evaluating the additional signal.

7. The method of claim 6 wherein the additional signal is a tire pressure signal, an ambient temperature signal, a powertrain configuration signal, a current gear signal, a drive mode selection signal, or a split mu signal.

8. The method of claim 1 further comprising:
    measuring a drive mode selection signal; and
    increasing the torque threshold when the drive mode selection signal indicates an aggressive driving mode for the vehicle.

9. The method of claim 8 wherein the aggressive driving mode is a sport mode.

10. The method of claim 1 wherein calculating the brake torque includes a gain that adjusts an apply rate for the brake torque and the gain is adjusted in response to an additional signal.

11. The method of claim 1 further comprising:
    reducing the propulsive torque when the torque threshold is exceeded.

12. A method of mitigating power hop in a vehicle, the method comprising the steps of:
    measuring longitudinal acceleration, lateral acceleration, intended travel angle, and requested drive torque signals for the vehicle;
    calculating a normal force signal from the longitudinal acceleration, lateral acceleration, intended travel angle, and requested drive torque signals;
    evaluating the normal force signal;
    calculating a brake torque as a function of a propulsive torque for the vehicle, wherein the propulsive torque is produced by a power source for the vehicle; and
    applying the brake torque when the normal force signal is less than a normal force threshold and a torque threshold is exceeded.

13. The method of claim 12 further comprising:
    measuring an additional signal;
    evaluating the additional signal; and
    applying the brake torque in response to evaluating the additional signal.

14. The method of claim 13 wherein the additional signal is a tire pressure signal, an ambient temperature signal, a powertrain configuration signal, a current gear signal, a drive mode selection signal, or a split mu signal.

15. An automotive vehicle comprising:
a driven wheel;
a power source producing a propulsive torque for the driven wheel;
a first sensor measuring a longitudinal acceleration as a longitudinal acceleration signal;
a second sensor measuring an intended travel angle as an intended travel angle signal;
a third sensor measuring a wheel speed as a wheel speed signal;
a fourth sensor measuring a requested drive torque as a requested drive torque signal;
an electronic control module evaluating the longitudinal acceleration, intended travel angle, wheel speed, and requested drive torque signals and calculating a brake torque as a function of the propulsive torque; and
a braking device applying the brake torque at the driven wheel when the longitudinal acceleration signal exceeds a longitudinal acceleration threshold, the intended travel angle signal is between intended travel angle limits, the wheel speed signal is less than a minimum speed threshold, the requested drive torque signal exceeds a requested drive torque threshold, and a torque threshold is exceeded.

16. The automotive vehicle of claim 1 wherein the longitudinal acceleration threshold, the intended travel angle limits, the minimum speed threshold, and the requested drive torque threshold are calibrated to values that occur prior to an onset of power hop.

17. The automotive vehicle of claim 1 wherein the torque threshold is calibrated as a function of peak power for the power source, a rate at which the power source produces torque, and braking force developed by the braking device.

18. The automotive vehicle of claim 1 wherein the intended travel angle signal is measured from a steering wheel angle signal or a road wheel angle signal.

19. The automotive vehicle of claim 1 wherein the brake torque is applied in response to evaluating an additional signal.

20. The automotive vehicle of claim 19 wherein the additional signal is a tire pressure signal, an ambient temperature signal, a powertrain configuration signal, a current gear signal, a drive mode selection signal, or a split mu signal.

* * * * *